UNITED STATES PATENT OFFICE.

GEORGE SEELY ENGLE, OF WASHINGTON, DISTRICT OF COLUMBIA, ASSIGNOR TO AMERICAN ELEMENTARY ELECTRIC COMPANY, OF WASHINGTON, DISTRICT OF COLUMBIA, A CORPORATION OF THE DISTRICT OF COLUMBIA.

ELECTROLYTE FOR PRIMARY BATTERIES.

1,356,436.  Specification of Letters Patent.  Patented Oct. 19, 1920.

No Drawing. Original application filed October 8, 1912, Serial No. 724,607. Divided and this application filed May 28, 1915. Serial No. 30,986.

*To all whom it may concern:*

Be it known that I, GEORGE S. ENGLE, a citizen of the United States, residing at Washington, District of Columbia, have invented certain new and useful Improvements in Electrolytes for Primary Batteries; and I do hereby declare the following to be a full, clear, and exact description of the invention, such as will enable others skilled in the art to which it appertains to make and use the same.

This invention relates to primary electric batteries, the object of the invention being to provide an improved electrolyte having alkaline characteristics, gelatinous in nature and a minimum causticity and is a division of my former application for process of making alkaline gelatinous electrolyte, filed October 8, 1912, Serial No. 724,607 and allowed March 24, 1915.

A further object is to provide an electrolyte with which the electromotive force of the battery will be maintained and local action reduced when the battery is not in use.

A further object of the invention is to provide an alkaline gelatinous electrolyte which will maintain its moisture content and stability without increasing the internal resistance of the battery.

The battery in which the electrolyte is used is preferably one having zinc positive electrodes and negative electrodes formed of two copper oxids (cupric oxid and cuprous oxid, for example).

In the making of the electrolyte, sodium hydroxid (NaOH) free from iron and preferably also free from silica is dissolved in water to make a solution of substantially 28 gravity Baumé. Cereal or vegetable starch is then mixed with the sodium hydroxid solution. The mixing may be effected by stirring the solution with a glass rod, then the solution is heated with occasional stirring until it reaches a temperature of approximately 180° F. when the heat is immediately shut off and the electrolyte stirred thoroughly and allowed to cool to a temperature where it will still flow and may be poured directly into the cell, in which it further cools and assumes a jelly-like consistency which does not change materially in the use of the cell.

The proportions of sodium hydroxid (NaOH), water and starch may be determined by quantitative analysis; thus such analysis shows that 4 grs. of starch are required to gelatinize 60 minims or 1 dram of water. It also shows that about 10 pounds of sodium hydroxid (NaOH) will make about 4 gallons of electrolyte at 28 gravity Baumé. It also shows that it requires one-sixth as much starch to gelatinize the alkaline electrolyte 28 gravity Baumé as it does to gelatinize water to produce a finished product having about thirty gravity Baumé. To give a concrete example, 10 pounds of sodium hydroxid (NaOH) requires approximately 2,731 grs. (specifically 2,730⅔ grs.) of starch to gelatinize it when in a solution of 28 gravity Baumé and 1 pound of sodium hydroxid will require approximately 273.1 (specifically 273.0⅔) grs. of starch in a solution of 28 gravity Baumé.

The temperature to which the electrolyte is subjected has been found to be an important factor but it has been found in treating large batches of the material when the heat is cut off after the mass reaches a temperature of 180° F. the temperature may continue to rise a few degrees, possibly to 190° F., but should not be allowed to exceed 190° F. To this extent the temperature of 180° stated is not to be taken as absolute, yet care must be taken, first to raise the temperature to a point, where the gelatinizing of the mass will be effective, and at the same time it must not be raised to a point where the solution will be discolored or the starch broken down into elements which are formed therefrom at higher temperatures, nor should the temperature be raised to a point where an excessive quantity of moisture will be driven off, thereby increasing the specific gravity of the solution. An increase in temperature above 190° has been found to be injurious, inasmuch as the efficiency of the electrolyte is greatly reduced and an excessive temperature will destroy its usefulness entirely.

The gelatinous electrolyte prevents the mixture of oxids from one plate to another, or, more specifically stated, the zinc oxid (ZnO) is held against or in proximity to the positive electrode, thereby in a measure protecting the electrode, and the electrolyte being in a gelatinous form, does not so readily act as a solvent, whereby the creation of conditions producing counter electromotive force is greatly retarded. The results attained will be understood from a consideration of the action of the gelatinous electrolyte for, if by chance the negative electrode should disintegrate, with a liquid electrolyte, polarization of the battery would be likely, or a continuous scaling (commonly called treeing) of the positive electrode sufficient to reach the negative plate might occur, thus forming a short circuit, but both of these actions are prevented by the gelatinous electrolyte. In the action of the present battery the $ZnO$ and $Na_2ZnO_2$ are held against the positive electrode until solution of the same takes place, this action being local and slow in a gelatinous electrolyte of the character specified. Furthermore, the said zincate being held against the positive plate acts as a protective barrier for preventing the electrode from being attacked so actively, but without reducing the E. M. F. because it is an oxid of the element used for the electrode. By the retardation of the solution of the $Na_2ZnO_2$ the whole electrolyte does not become impregnated at once, thus maintaining the E. M. F. for a much longer period.

While I have specifically described the use of sodium hydroxid (NaOH) as the alkaline ingredient of the electrolyte, I do not wish to be specifically limited thereto, save where so specified in the claims, inasmuch as it is found that other alkaline ingredients may be employed, such, for example, as potassium hydroxid (KOH).

Having thus described my invention, what I claim as new and desire to secure by Letters Patent of the United States, is:

1. A gelatinous alkaline electrolyte for primary batteries formed of an alkaline hydroxid of approximately 28 gravity Baumé with which vegetable starch is combined at a temperature of approximately 180° F. and in quantity substantially less than that required to gelatinize an equal quantity of water.

2. A gelatinous alkaline electrolyte for primary batteries formed of sodium hydroxid of approximately 28 gravity Baumé with which vegetable starch is combined at a temperature of approximately 180° F. and in quantity substantially less than that required to gelatinize an equal quantity of water.

3. A gelatinous alkaline electrolyte for primary batteries formed of an alkaline hydroxid of approximately 28 gravity Baumé with which vegetable starch is combined at a temperature of approximately 180° F. and in substantally the proportions of approximately 273.1 grs. of starch to one pound of hydroxid.

4. A gelatinous alkaline electrolyte for primary batteries formed of an alkaline hydroxid of approximately 28 gravity Baumé with which starch is combined at a temperature of approximately 180° F. and in quantity substantially less than that required to gelatinize an equal quantity of water.

5. A gelatinous alkaline electrolyte for primary batteries formed of sodium hydroxid of approximately 28 gravity Baumé with which starch is combined at a temperature of approximately 180° F. and in quantity substantially less than that required to gelatinize an equal quantity of water.

6. A gelatinous alkaline electrolyte for primary batteries formed of an alkaline hydroxid of approximately 28 gravity Baumé with which starch is combined at a temperature of approximately 180° F. and in substantially the proportions of approximately 273.1 grs. of starch to one pound of hydroxid.

In testimony whereof I have signed my name to this specification.

GEORGE SEELY ENGLE.